US009481240B1

(12) United States Patent
Stack et al.

(10) Patent No.: US 9,481,240 B1
(45) Date of Patent: Nov. 1, 2016

(54) COVER ASSEMBLY FOR A FILLING PORT OF A VEHICLE

(71) Applicant: GM GLOBAL TECHNOLOGY OPERATIONS LLC, Detroit, MI (US)

(72) Inventors: Matthew M. Stack, Macomb Township, MI (US); Robin L. Champion, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/835,142

(22) Filed: Aug. 25, 2015

Related U.S. Application Data

(60) Provisional application No. 62/153,233, filed on Apr. 27, 2015.

(51) Int. Cl.
*B62D 25/00* (2006.01)
*B60K 15/05* (2006.01)

(52) U.S. Cl.
CPC ......... *B60K 15/05* (2013.01); *B60K 2015/053* (2013.01); *B60K 2015/0561* (2013.01)

(58) Field of Classification Search
CPC ............ G06F 1/181; Y10T 29/49826; B65D 2543/00296; H01R 13/6275; H01R 13/6658; G11B 33/0422; H02G 3/0418; B25H 3/003; B41J 11/0045; B41J 11/005; B60K 15/05; B60K 2015/0507; B60K 2015/0592
USPC ....................................................... 296/97.22
See application file for complete search history.

(56) References Cited

U.S. PATENT DOCUMENTS

| | | | | |
|---|---|---|---|---|
| 5,462,190 A * | 10/1995 | Lienhart | ................ | B60K 15/05 220/375 |
| 7,281,640 B2 * | 10/2007 | Hagano | .............. | B60K 15/0406 220/375 |
| 7,380,861 B2 * | 6/2008 | Engel | ..................... | B60K 15/05 296/97.22 |
| 8,740,283 B2 * | 6/2014 | Yamamaru | .......... | B60L 11/1818 296/136.01 |
| 9,227,509 B1 * | 1/2016 | Jones | ..................... | B60K 15/05 |
| 9,376,012 B2 * | 6/2016 | Brown | ................... | B60K 15/05 |
| 2005/0280276 A1 * | 12/2005 | McComsey | ........... | B60K 15/05 296/97.22 |
| 2007/0040409 A1 * | 2/2007 | Alfaro | ................... | B60K 15/05 296/97.22 |
| 2008/0136210 A1 * | 6/2008 | Scott | ...................... | B60K 15/04 296/97.22 |
| 2009/0026794 A1 * | 1/2009 | Zentner | .................. | B60K 15/05 296/97.22 |
| 2009/0139991 A1 * | 6/2009 | Nakaya | .................. | B60K 15/05 220/315 |
| 2009/0189410 A1 * | 7/2009 | Gurtatowski | .......... | B60K 15/05 296/97.22 |
| 2009/0309386 A1 * | 12/2009 | Yamamoto | ......... | B60K 15/0406 296/97.22 |
| 2010/0230992 A1 * | 9/2010 | Winkler | ................. | B60K 15/05 296/97.22 |
| 2011/0025087 A1 * | 2/2011 | Ramos | ................... | B60K 15/05 296/97.22 |
| 2011/0285165 A1 * | 11/2011 | Baba | ....................... | E05F 5/022 296/97.22 |
| 2011/0285166 A1 * | 11/2011 | Baba | ................... | E05D 11/1007 296/97.22 |
| 2012/0049566 A1 * | 3/2012 | Kiefer | .................... | B60K 15/05 296/97.22 |

(Continued)

*Primary Examiner* — Kiran B Patel
(74) *Attorney, Agent, or Firm* — Quinn Law Group, PLLC

(57) ABSTRACT

A cover assembly for a filling port of a vehicle includes a hinge structure and a cover portion. The hinge structure includes an interface portion having a plurality of retention tabs. Each of the plurality of retention tabs include an inboard surface that is spaced from an outboard surface of the interface portion. The cover portion includes a plurality of cover tabs. Each of the cover tabs include an outboard surface that is spaced from an inboard surface of the cover portion. The cover portion is disposed adjacent the outboard surface of the interface portion. Each of the retention tabs is engaged with one of the cover tabs in interlocking engagement. Each of the cover tabs is disposed between one of the retention tabs and the interface portion. Each of the retention tabs is disposed between one of the cover tabs and the cover portion.

20 Claims, 5 Drawing Sheets

(56) References Cited

U.S. PATENT DOCUMENTS

| | | | |
|---|---|---|---|
| 2012/0153661 A1* | 6/2012 | Woodworth | B60K 15/05 296/97.22 |
| 2012/0161462 A1* | 6/2012 | Zentner | B60K 15/04 296/97.22 |
| 2013/0134737 A1* | 5/2013 | Ogata | B60K 15/05 296/97.22 |
| 2013/0153257 A1* | 6/2013 | Yamamaru | B60L 11/1818 174/67 |
| 2013/0249235 A1* | 9/2013 | Lorenc | B60K 15/04 296/97.22 |
| 2014/0251036 A1* | 9/2014 | Ishiguro | B60K 15/05 74/55 |
| 2015/0001216 A1* | 1/2015 | Ushigome | B60K 15/04 220/86.2 |
| 2015/0048087 A1* | 2/2015 | Hagano | B60K 15/04 220/86.2 |
| 2015/0048644 A1* | 2/2015 | Georgi | B60K 15/05 296/97.22 |
| 2015/0217638 A1* | 8/2015 | Chiba | B60K 15/05 296/97.22 |
| 2015/0283898 A1* | 10/2015 | Morris | E05F 7/005 49/386 |
| 2015/0375630 A1* | 12/2015 | Jeong | B60K 15/05 49/386 |
| 2016/0001653 A1* | 1/2016 | Cisternino | B60K 15/04 220/86.2 |
| 2016/0009173 A1* | 1/2016 | Sperando | B60K 15/04 220/86.2 |
| 2016/0039280 A1* | 2/2016 | Kim | B60K 15/04 220/86.2 |
| 2016/0101686 A1* | 4/2016 | Brown | B60K 15/05 296/97.22 |

* cited by examiner

COVER ASSEMBLY FOR A FILLING PORT OF A VEHICLE

CROSS-REFERENCE TO RELATED APPLICATIONS

This application claims the benefit of U.S. Provisional Patent Application Ser. No. 62/153,233, filed on Apr. 27, 2015, the disclosure of which is hereby incorporated by reference.

TECHNICAL FIELD

The disclosure generally relates to a cover assembly for covering a filling port of a vehicle.

BACKGROUND

Vehicles often include one or more filling ports, such as but not limited to a fuel filling port, which are accessed through an opening in a body panel of the vehicle. Such vehicles generally include a cover assembly that is attached to the body of the vehicle, and covers the filling port. A hinge is used to attach the cover assembly to the body, so that the cover assembly may rotate between an open position providing access to the filling port, and a closed position covering the filling port, and providing an exterior surface that is substantially flush with the body panel adjacent the filling port.

SUMMARY

A cover assembly for a filling port of a vehicle is provided. The cover assembly includes a hinge structure having an interface portion that defines a central axis. The hinge structure includes a plurality of retention tabs that are connected to the interface portion. Each of the plurality of retention tabs is disposed generally parallel with a reference plane, and include an inboard surface that is spaced from an outboard surface of the interface portion. A cover portion includes a plurality of cover tabs. Each of the plurality of cover tabs is disposed generally parallel with the reference plane, and include an outboard surface that is spaced from an inboard surface of the cover portion. The cover portion is disposed adjacent the outboard surface of the interface portion of the hinge structure. Each of the plurality of retention tabs is engaged with one of the plurality of cover tabs in interlocking engagement to define pairs of interlocking tabs. Each of the cover tabs is disposed between one of the retention tabs and the interface portion of the hinge structure. Each of the retention tabs is disposed between one of the cover tabs and the cover portion.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
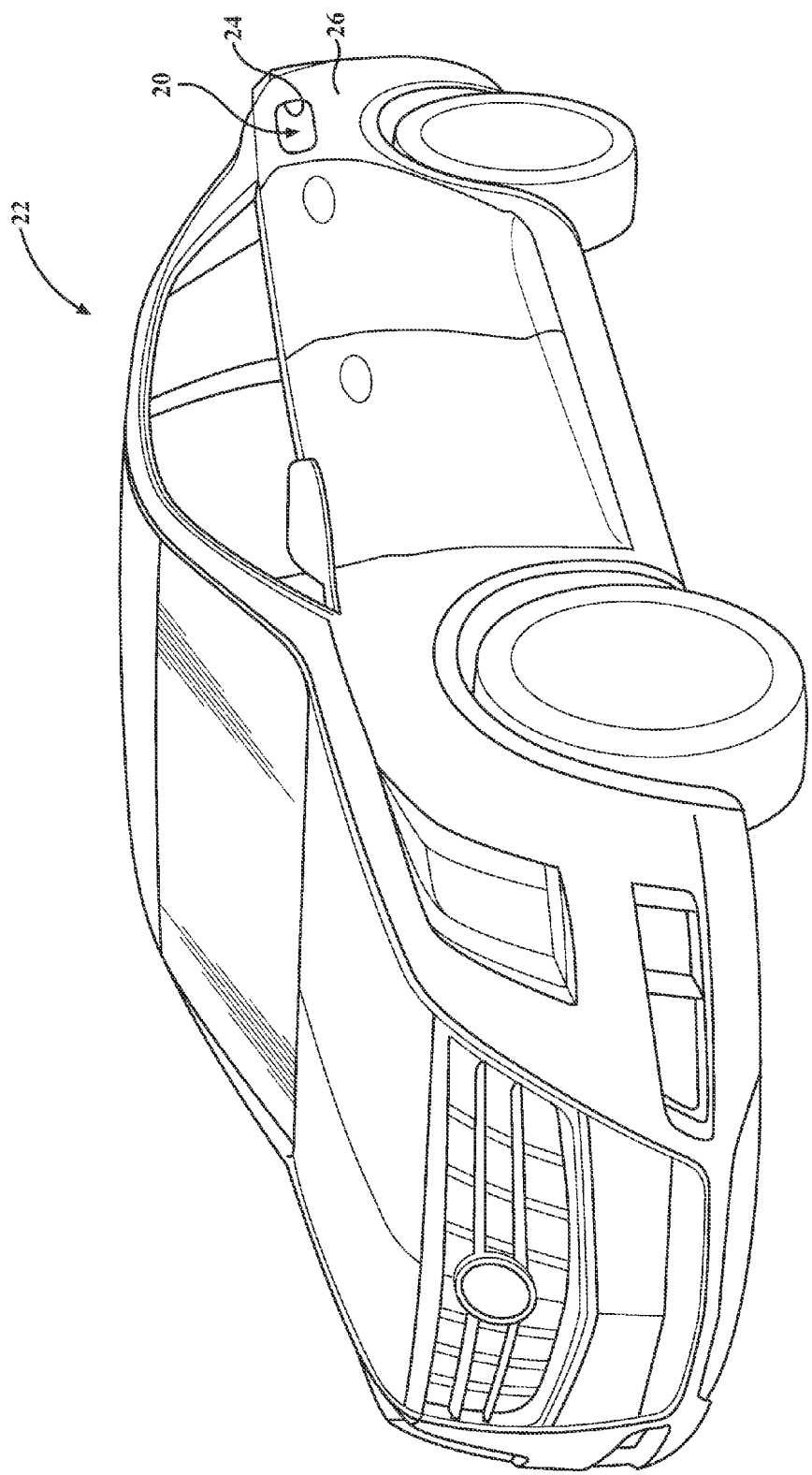
FIG. 1 is a schematic perspective view of a vehicle showing a cover assembly.

Referring to the Figures, wherein like numerals indicate like parts throughout the several views, a cover assembly is generally shown at 20. Referring to FIG. 1, the cover assembly 20 is for a vehicle 22, and is used to cover a filling port 24 of the vehicle 22. The filling port 24 may include, but is not limited to, a fuel filling port 24, or an electrical charging port/connection. Additionally, it should be appreciated that the cover assembly 20 may be used to cover any small feature of the vehicle 22 that must be accessed from an exterior of the vehicle 22. The cover assembly 20 attaches to a body 26 of the vehicle 22, and is moveable between an open position and a closed position. When disposed in the closed position, the cover assembly 20 provides an exterior surface that is generally flush with the exterior of the body 26 to cover and conceal the filling port 24. When disposed in the open position, the cover assembly 20 is positioned away from the exterior of the body 26, thereby exposing an opening in the body 26 providing access to the filling port 24.

Figure 2:
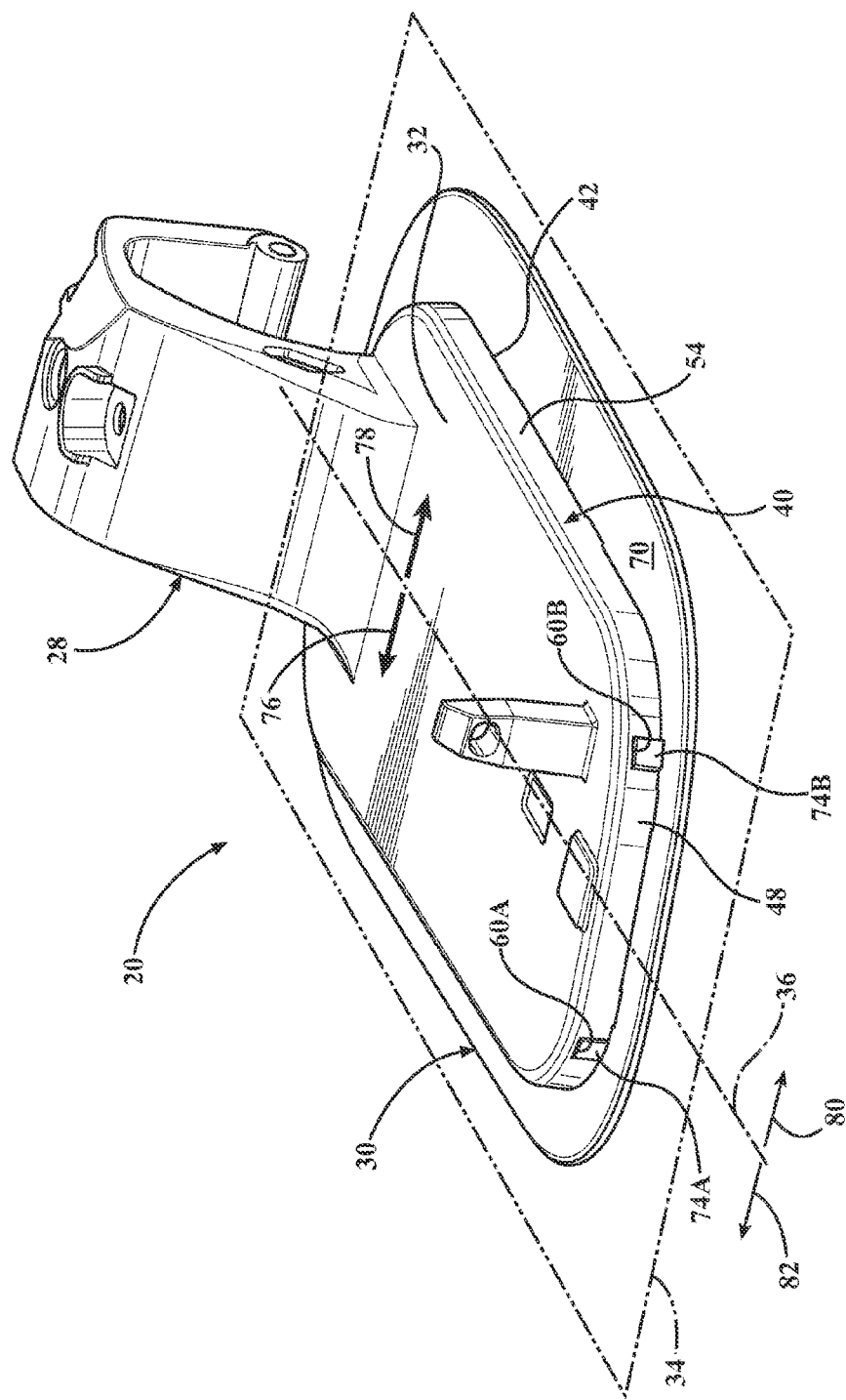
FIG. 2 is a schematic perspective view of the cover assembly from an inboard side of the cover assembly.
Figure 3:
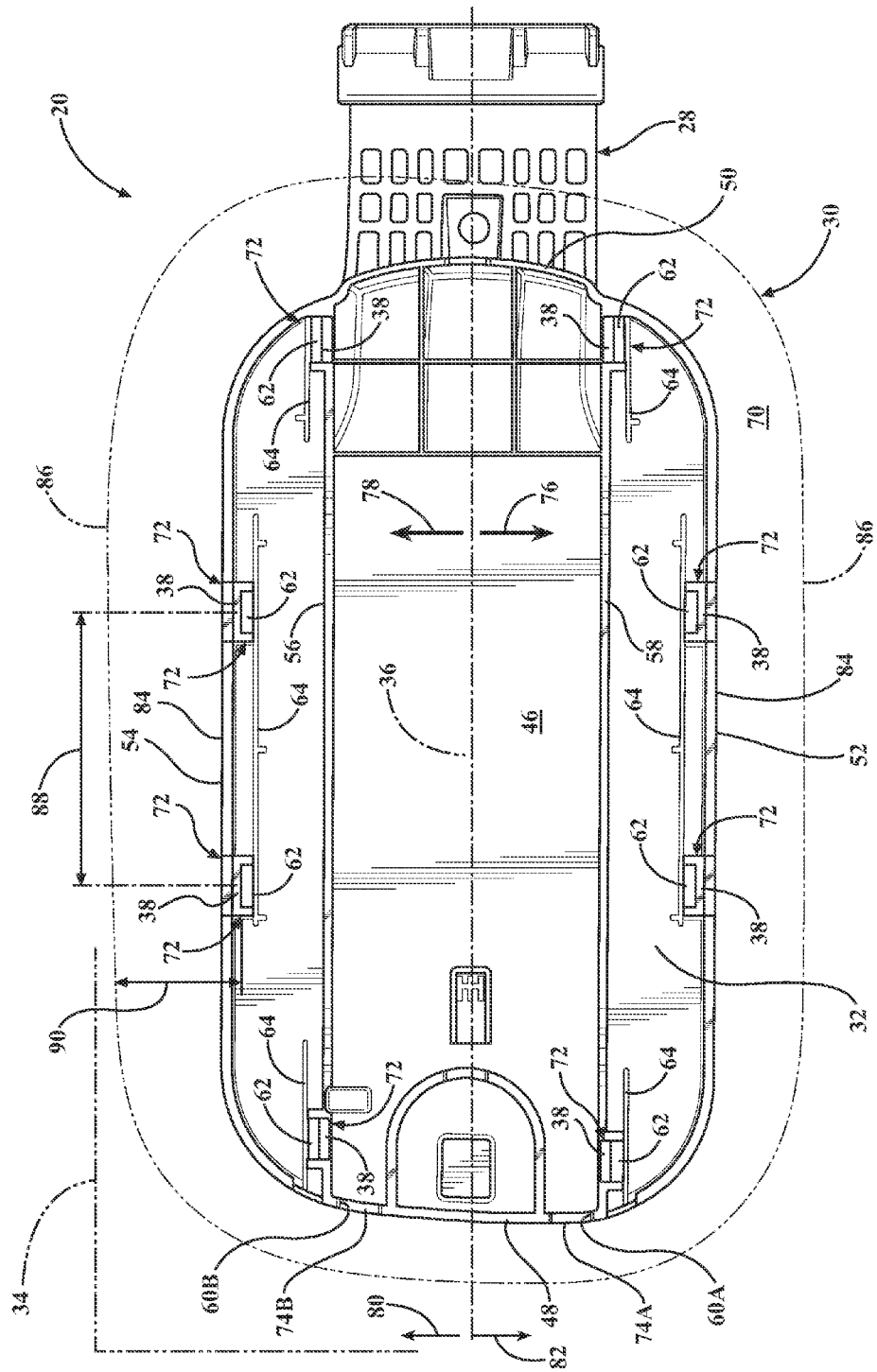
FIG. 3 is a schematic plan view of an outboard surface of a hinge structure of the cover assembly.
Figure 4:
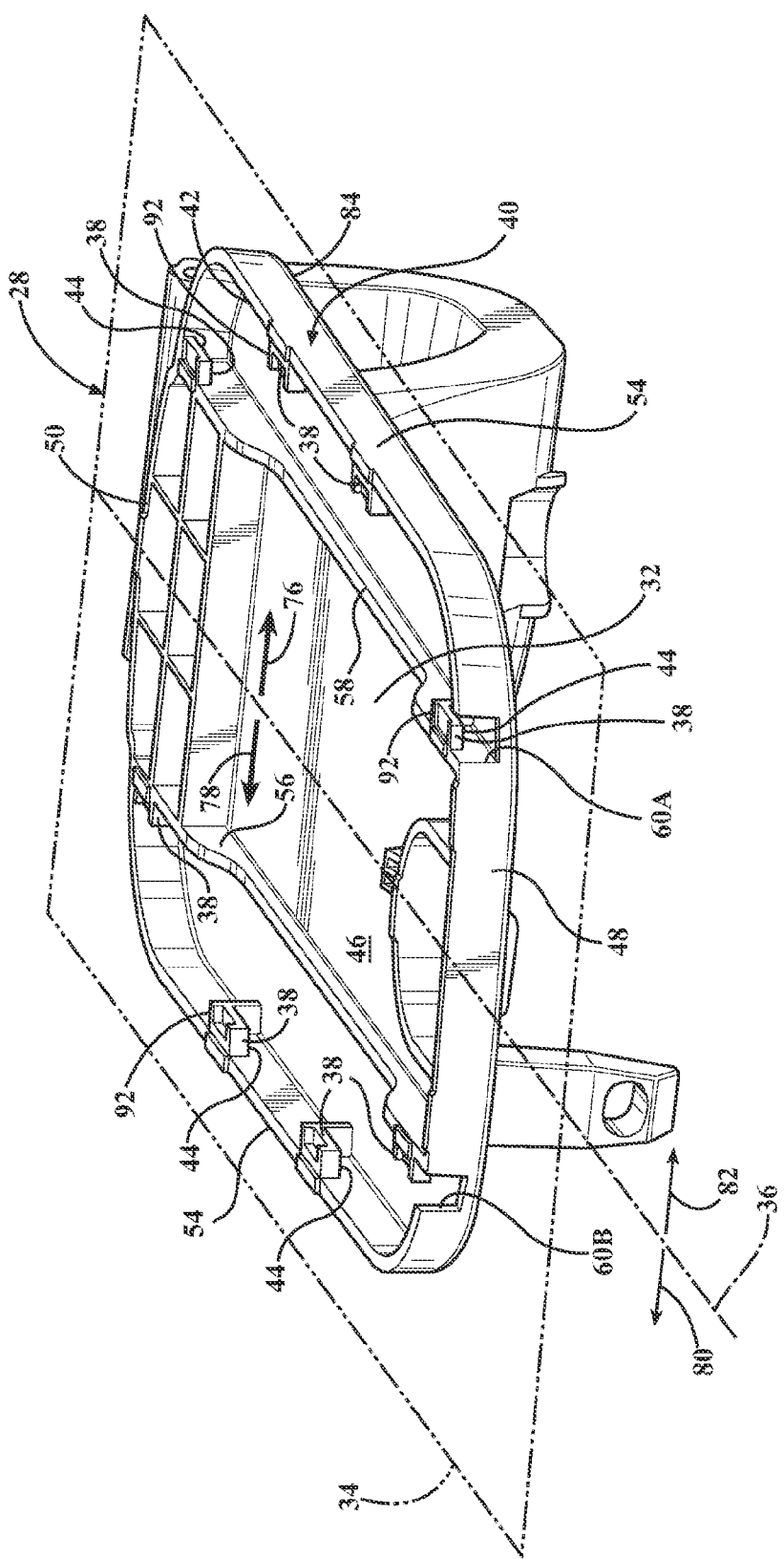
FIG. 4 is a schematic perspective view of the hinge structure from an outboard side of the hinge structure.
Figure 5:
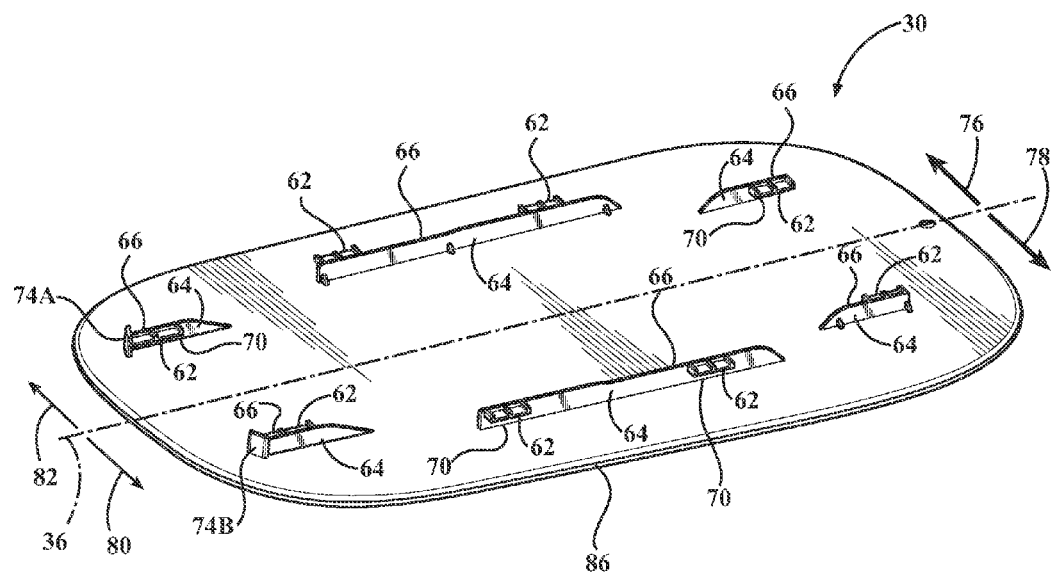
FIG. 5 is a schematic perspective view of a cover portion of the cover assembly from an inboard side of the cover portion.
Figure 6:
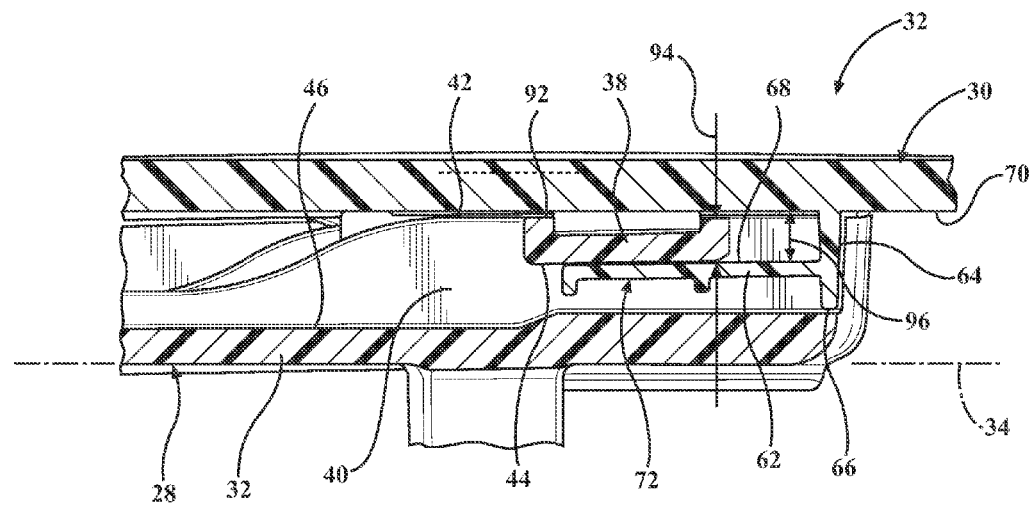
FIG. 6 is a schematic, fragmentary cross sectional view of the cover assembly.

Referring to FIG. 2, the cover assembly 20 includes a hinge structure 28 (also shown in FIGS. 3, 4, and 6), and a cover portion 30 (also shown in FIGS. 3, 5, and 6). The hinge structure 28 is attached to the body 26 of the vehicle 22, and is rotatably moveable relative to the body 26 of the vehicle 22 to allow movement of the cover assembly 20 between the open position and the closed position. A hinge type connection may be used to rotatably attach the hinge structure 28 to the body 26 of the vehicle 22. The hinge type connection may be configured in any suitable manner. The specific configuration of the hinge connection between the hinge structure 28 and the body 26 of the vehicle 22 is not pertinent to the teachings of this disclosure, and is therefore not described in detail herein.

Referring to FIGS. 3 and 4, the hinge structure 28 includes an interface portion 32. The interface portion 32 defines and extends along a central axis 36. The interface portion includes a plurality of retention tabs 38. Specifically, the interface portion 32 includes a plurality of hinge walls 40 that extend outboard from the interface portion 32. The hinge walls 40 interconnect the plurality of retention tabs 38 and the interface portion 32. As used herein, the term "outboard" is used to define a feature or a surface that is located farther from or faces away from a center of the vehicle 22. As used herein, the term "inboard" is used to define a feature or a surface that is located nearer to or faces toward the center of the vehicle 22. Therefore, a described feature or surface that is positioned inboard of a reference feature or surface is located nearer the center of the vehicle 22 than the reference feature or surface, and a described feature that is positioned outboard of a reference feature or surface is located farther from the center of the vehicle 22 than the reference feature or surface. It should be appreciated that the terms inboard and outboard are merely used as descriptors to help define the orientation of the different components of the cover assembly 20.

As noted above, the interface portion 32 includes the hinge walls 40, which extend outboard from the interface portion 32 of the hinge structure 28, to a distal edge 42. Each of the retention tabs 38 is attached to the distal edge 42 of one of the hinge walls 40. Each of the retention tabs 38 includes an inboard surface 44. The inboard surfaces 44 of the retention tabs 38 cooperate together to define a common reference surface 34. In some embodiments, such as the exemplary embodiment shown in the Figures, the retention tabs 38 may be disposed on the interface portion 32 in a generally planar relationship with each other, such that the common reference surface 34 is planar. Accordingly, the description of the exemplary embodiment shown in the Figures may hereinafter refer to the reference plane 34 as the reference plane 34. However, it should be appreciated that the common reference surface 34 may not be planar in other embodiments, and may include some degree of curvature.

In the exemplary embodiment shown in the Figures, each of the retention tabs 38 extends from the distal edge 42 of their respective hinge wall 40, in a generally parallel relationship with the reference plane 34. The inboard surface 44 of each of the retention tabs 38 is spaced from an outboard surface 46 of the interface portion 32. It should be appreciated that the interface portion 32 may include a general curvature in one or more directions and/or axis. In the exemplary embodiment shown in the Figures, each of the retention tabs 38 is generally parallel with the reference plane 34. Accordingly, the specific distance between outboard surface 46 of the interface portion 32 and the inboard surface 44 will vary for each of the retention tabs 38. Additionally, as used herein, the term "generally parallel" should be interpreted as parallel with only minor deviations caused by ordinary manufacturing tolerances and/or variations. Alternatively, other embodiments may include the common reference surface 34 including a generally degree of curvature that parallels that of the interface portion 32, such that the distance between the outboard surface 46 of the interface portion 32 and the inboard surface 44 of the retention tabs 38 is approximately equal.

Referring to FIG. 3, the plurality of hinge walls 40 may be arranged in any desirable manner. As shown, the plurality of walls include a peripheral wall having a first end wall 48, a second end wall 50, an upper edge wall 52, and a lower edge wall 54, all disposed around a perimeter 84 of the interface portion 32. The first end wall 48 and the second end wall 50 extend generally transverse to the central axis 36, whereas the upper edge wall 52 and the lower edge wall 54 extend generally parallel with and along the central axis 36. Additionally, the plurality of walls include a first rib wall 56 and a second rib wall 58 extending generally parallel with the central axis 36, and laterally spaced inward from the upper edge wall 52 and the lower edge wall 54 respectively, relative to the central axis 36. It should be appreciated that the hinge walls 40 of the hinge structure 28 may be configured differently than shown and described herein.

Referring to FIG. 4, the first end wall 48 includes at least one cut-out 60. Specifically, the first end wall 48 includes a pair of cut-outs 60, with a first cut-out 60A disposed adjacent the first rib wall 56, and a second cut-out 60B disposed adjacent the second rib wall 58. The purpose of the cut-outs 60 is described in greater detail below.

As shown in FIGS. 2 and 6, the cover portion 30 is attached to the hinge structure 28. Referring to FIG. 5, the cover portion 30 includes a plurality of cover tabs 62 that are connected to the cover portion 30. Specifically, the cover portion 30 includes a plurality of cover walls 64 that extend inboard from the cover portion 30 to a distal edge 66. The cover walls 64 interconnect the plurality of cover tabs 62 and the cover portion 30. Each of the cover tabs 62 is attached to the distal edge 66 of one of the cover walls 64. Each of the cover tabs 62 includes an outboard surface 68. Each of the outboard surfaces 68 of the cover tabs 62 correspond to the common reference surface 34, e.g., the reference plane 34, defined by the inboard surfaces 44 of the retention tabs 38. In the exemplary embodiment shown in the Figures, each of the cover tabs 62 extends from the distal edge 66 of their respective cover wall 64, in a generally parallel relationship with each other, and generally parallel to the reference plane 34 and the retention tabs 38.

The outboard surface 68 of each of the cover tabs 62 is spaced from an inboard surface 70 of the cover portion 30. It should be appreciated that the cover portion 30 may include a general curvature in one or more directions and/or axis. The cover portion 30 may or may not be parallel with the interface portion 32. However, each of the cover tabs 62 is generally parallel with the common reference surface 34 defined by the inboard surfaces 44 of the retention tabs 38, e.g., the reference plane 34 of the exemplary embodiment. Accordingly, the specific distance between inboard surface 70 of the cover portion 30 and the outboard surface 68 of the cover tabs 62 may vary for each of the cover tabs 62. As noted above, the term "generally parallel" should be interpreted as parallel with only minor deviations caused by ordinary manufacturing tolerances and/or variations.

As noted above, each of the cover walls 64 extend inboard from the inboard surface 70 of the cover portion 30, toward the outboard surface 46 of the interface portion 32 of the hinge structure 28, to a respective distal edge 66. However, referring to FIG. 6, the distal edges 66 of the cover walls 64 are spaced from the outboard surface 46 of the interface portion 32 of the hinge structure 28. As such, the distal edges 66 of the cover walls 64 do not contact the outboard surface 46 of the interface portion 32 of the hinge structure 28. Similarly, the distal edges 42 of the hinge walls 40 do not contact the inboard surface 70 of the cover portion 30.

As best shown in FIG. 6, the cover portion 30 is disposed adjacent the outboard surface 46 of the interface portion 32 of the hinge structure 28. Each of the retention tabs 38 is engaged with one of the cover tabs 62 in interlocking engagement to define pairs of interlocking tabs 72. As such, each of the cover tabs 62 is disposed between one of the retention tabs 38 and the interface portion 32 of the hinge structure 28, and each of the retention tabs 38 is disposed between one of the cover tabs 62 and the cover portion 30. This arrangement positions the inboard surface 44 of the retention tab 38 of each respective pair of interlocking tabs 72 against the outboard surface 68 of the cover tab 62 of each respective pair of interlocking tabs 72. Accordingly, the inboard surface 44 of the retention tabs 38 and the outboard surface 68 of the cover tabs 62 engage each other on the reference surface 34. The exemplary embodiment shows the reference surface as a plane, and as such, the inboard surface 44 of the retention tabs 38 and the outboard surface 68 of the cover tabs 62 of each respective pair of interlocking tabs 72 engage each other on the same, common reference plane 34.

However, it should be appreciated that if the common reference surface 34 were non-planar, than the inboard surface 44 of the retention tabs 38 and the outboard surface 68 of the cover tabs 62 of each respective pair of interlocking tabs 72 would engage each other along the common reference surface 34, but would not lie on the same plane.

Referring to FIGS. 3, 4, and 5, all of the cover tabs 62 and retention tabs 38 are positioned so that they extend axially along the central axis 36. By positioning the cover tabs 62 and the retention tabs 38 in this manner, the cover assembly 20 may be assembled by positioning the cover portion 30 adjacent the hinge structure 28, and then sliding the cover portion 30 along the central axis 36 so that the cover tabs 62 slide under the retention tabs 38 into interlocking engagement. As such, the cover portion 30 may slide into position relative to the hinge structure 28, along the central axis 36.

As noted above and best shown in FIG. 4, the first end wall 48 includes the first cut-out 60A disposed adjacent the first rib wall 56, and the second cut-out 60B disposed adjacent the second rib wall 58. The first cut-out 60A and the second cut-out 60B allow the cover tabs 62 disposed adjacent to the first cut-out 60A and the second cut-out 60B to slide through the first end wall 48 as the cover portion 30 is slid into position relative to the hinge structure 28. Therefore, the cut-outs 60 are operable to allow at least one of the cover tabs 62 to slide through the cut-out 60 and into interlocking engagement with a respective one of the retention tabs 38.

Referring to FIG. 5, the cover portion 30 includes at least one close-out feature 74 that extends inboard, away from the inboard surface 70 of the cover portion 30, and toward the interface portion 32 of the hinge structure 28. Referring also to FIG. 2, the close-out feature 74 is disposed adjacent the cut-out 60 of the end wall to conceal or cover the cut-out 60, thereby providing an aesthetically pleasing finish to the cover assembly 20, and limiting an influx of dirt and debris into the space between the cover portion 30 and the hinge structure 28. As shown, the cover portion 30 includes a first close-out features 74A disposed adjacent the first cut-out 60A, and a second close-out features 74B disposed adjacent the second cut-out 60B.

Referring to FIGS. 4 and 5 and as noted above, the interface portion 32 extends along the central axis 36. More specifically, the central axis 36 bisects the hinge structure 28 and the cover portion 30 to define a first side 76 of the central axis 36 and a second side 78 of the central axis 36. A first group of the pairs of interlocking tabs 72 is disposed on the first side 76 of the central axis 36, and a second group of the pairs of interlocking tabs 72 is disposed on the second side 78 of the central axis 36. Preferably, the first group of the pairs of interlocking tabs 72 includes half of a total number of the pairs of interlocking tabs 72, and the second group of the pairs of interlocking tabs 72 includes another half of the total number of the pairs of interlocking tabs 72. Accordingly, the pairs of interlocking tabs 72 are evenly distributed between the first side 76 of the central axis 36 and the second side 78 of the central axis 36. However, it is conceivable that at least one of the pairs of interlocking tabs 72 is disposed directly on the central axis 36.

At least one of the pairs of interlocking tabs 72 of the first group of the pairs of interlocking tabs 72 includes the respective cover tab 62 of that pair that extends from one of the plurality of hinge walls 40 away from the central axis 36, in a first transverse direction 80, and the respective retention tab 38 of that pair extends from one of the plurality of hinge walls 40 toward the central axis 36 in a second transverse direction 82. The first transverse direction 80 is opposite the second transverse direction 82. The first transverse direction 80 and the second transverse direction 82 are substantially perpendicular to the central axis 36, and parallel with the reference plane 34. Additionally, at least one of the pairs of interlocking tabs 72 of the first group of the pairs of interlocking tabs 72 includes the respective cover tab 62 of that pair extending from one of the plurality of hinge walls 40 toward the central axis 36 in the second transverse direction 82, and the respective retention tab 38 of that pair extending from one of the plurality of hinge walls 40 away from the central axis 36 in the first transverse direction 80.

As shown in the figures, half of the cover tabs 62 of the first group of the pairs of interlocking tabs 72 extend from their respective cover wall 64 in the first direction, and the other half of the cover tabs 62 of the first group of the pairs of interlocking tabs 72 extend from their respective cover wall 64 in the second direction. Similarly, half of the retention tab 38 of the first group of the pairs of interlocking tabs 72 extend from their respective hinge wall 40 in the first direction, and the other half of the retention tabs 38 of the first group of the pairs of interlocking tabs 72 extend from their respective hinge wall 40 in the second direction.

Referring to FIGS. 4 and 5, the second group of the pairs of interlocking tabs 72 are arranged in a similar manner, with at least one of the pairs of interlocking tabs 72 of the second group of the pairs of interlocking tabs 72 having the respective cover tab 62 of that pair extending from one of the plurality of hinge walls 40 away from the central axis 36 in the second transverse direction 82, and the respective retention tab 38 of that pair extending from one of the plurality of hinge walls 40 toward the central axis 36 in the first transverse direction 80. Additionally, at least one of the pairs of interlocking tabs 72 of the second group of the pairs of interlocking tabs 72 includes the respective cover tab 62 of that pair extending from one of the plurality of hinge walls 40 toward the central axis 36 in the first transverse direction 80, and the respective retention tab 38 of that pair extending from one of the plurality of hinge walls 40 away from the central axis 36 in the second transverse direction 82.

As shown in the figures, half of the cover tabs 62 of the second group of the pairs of interlocking tabs 72 extend from their respective cover wall 64 in the first direction, and the other half of the cover tabs 62 of the second group of the pairs of interlocking tabs 72 extend from their respective cover wall 64 in the second direction. Similarly, half of the retention tabs 38 of the second group of the pairs of interlocking tabs 72 extend from their respective hinge wall 40 in the first direction, and the other half of the retention tabs 38 of the second group of the pairs of interlocking tabs 72 extend from their respective hinge wall 40 in the second direction.

By arranging the pairs of interlocking tabs 72 in the above described configuration, a force applied to the cover portion 30 parallel with the reference plane 34 and transverse to the central axis 36 will operate to dislodge half of the pairs of interlocking tabs 72 of each of the first group and the second group of interlocking tabs, but will simultaneously operate to tighten the other half of the pairs of interlocking tabs 72 of each of the first group and the second group of interlocking tabs. Accordingly, the arrangement of the pairs of interlocking tabs 72 described above prevents the cover portion 30 from being dislodged from the hinge structure 28 by a force applied to the cover portion 30 parallel with the reference plane 34 and transverse to the central axis 36.

Referring to FIG. 3, the pairs of interlocking tabs 72 are preferably positioned adjacent the perimeter 84 of the interface portion 32. Preferably, the pairs of interlocking tabs 72 are spaced from each other an approximately equal distance 88 from each other around the perimeter 84 of the interface portion 32. As used herein, the term "approximately equal distance" between adjacent pairs of interlocking tabs 72 is defined as a relative spacing between adjacent pairs of the interlocking tabs that varies by no more than 20% from the relative spacing of the other adjacent pairs of interlocking tabs 72. Evenly positioning the pairs of interlocking tabs 72 around the perimeter 84 of the interface portion 32 distributes the load therebetween evenly between the cover portion 30 and the hinge structure 28, thereby helping to limit undesirable warping and/or bending.

Preferably, each of the pairs of interlocking tabs 72 are spaced from a perimeter 86 of the cover portion 30 a distance 90 that is equal to or less than 30 mm. By placing the pairs of interlocking tabs 72 at the perimeter 84 of the interface portion 32, and as close to the perimeter 86 of the cover portion 30 as possible, and possible warping of the cover portion 30 extending beyond the perimeter 84 of the interface portion 32 is limited, which helps maintain a flush fit between the cover portion 30 and the exterior surface of the body 26.

Preferably, the distance 88 between adjacent pairs of the interlocking tabs measured around the perimeter 84 of the interface portion 32 is equal to or less than twice a distance 90 between the pairs of interlocking tabs 72 and the perimeter 86 of the cover portion 30. For example, if each of the pairs of interlocking tabs 72 is spaced from the perimeter 86 of the cover portion 30 a distance 90 that is equal to 30 mm, then the distance 88 between adjacent pairs of interlocking tabs 72, measured around the perimeter 84 of the interface portion 32, will be equal to or less than 60 mm.

Referring to FIG. 6, each of the retention tabs 38 includes a pad surface 92 that is spaced from the outboard surface 46 of the interface portion 32. The pad surface 92 is spaced from the inboard surface 44 of the retention tab 38 a first distance 94. The outboard surface 68 of each of the cover tabs 62 is spaced from the inboard surface 70 of the cover portion 30 a second distance 96. The second distance 96 is equal to or less than the first distance 94 so that the interlocking engagement between the respective pairs of retention tabs 38 and cover tabs 62 biases the cover portion 30 against the pad surface 92 of the retention tabs 38. As described above, the distal edges 66 of the cover walls 64 do not contact the outboard surface 46 of the interface portion 32. This configuration provides cross vehicle 22 datum control, and provides an even, snug fit between the cover portion 30 and the hinge structure 28.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A cover assembly for a filling port of a vehicle, the cover assembly comprising:
    a hinge structure including an interface portion defining a central axis;
    wherein the interface portion includes a plurality of retention tabs, with each of the plurality of retention tabs having an inboard surface, and with the inboard surface of each of the retention tabs cooperating to define a reference surface;
    a cover portion disposed proximal to the interface portion, and including a plurality of cover tabs positioned to generally correspond to the reference surface, with each of the plurality of cover tabs including an outboard surface; and
    wherein each of the plurality of retention tabs is engaged with one of the plurality of cover tabs in interlocking engagement to define pairs of interlocking tabs, with the inboard surface of the retention tab positioned against the outboard surface of the cover tab of each respective pair of interlocking tabs.

2. The cover assembly set forth in claim 1 wherein the central axis bisects the hinge structure and the cover portion to define a first side of the central axis and a second side of the central axis, with a first group of the pairs of interlocking tabs disposed on the first side of the central axis, and with a second group of the pairs of interlocking tabs disposed on the second side of the central axis.

3. The cover assembly set forth in claim 2 wherein the interface portion includes a plurality of hinge walls extending outboard from the interface portion, and interconnecting the plurality of retention tabs and the interface portion.

4. The cover assembly set forth in claim 3 wherein at least one of the pairs of interlocking tabs of the first group of the pairs of interlocking tabs includes the respective cover tab extending from one of the plurality of hinge walls away from the central axis in a first transverse direction, and the respective retention tab extending from one of the plurality of hinge walls toward the central axis in a second transverse direction, wherein the first transverse direction is opposite the second transverse direction, and wherein the first transverse direction and the second transverse direction are substantially perpendicular to the central axis.

5. The cover assembly set forth in claim 4 wherein at least one of the pairs of interlocking tabs of the first group of the pairs of interlocking tabs includes the respective cover tab extending from one of the plurality of hinge walls toward the central axis in the second transverse direction, and the respective retention tab extending from one of the plurality of hinge walls away from the central axis in the first transverse direction.

6. The cover assembly set forth in claim 5 wherein at least one of the pairs of interlocking tabs of the second group of the pairs of interlocking tabs includes the respective cover tab extending from one of the plurality of hinge walls away from the central axis in the second transverse direction, and the respective retention tab extending from one of the plurality of hinge walls toward the central axis in the first transverse direction.

7. The cover assembly set forth in claim 6 wherein at least one of the pairs of interlocking tabs of the second group of the pairs of interlocking tabs includes the respective cover tab extending from one of the plurality of hinge walls toward the central axis in the first transverse direction, and the respective retention tab extending from one of the plurality of hinge walls away from the central axis in the second transverse direction.

8. The cover assembly set forth in claim 3 wherein the plurality of hinge walls include an end wall disposed transverse to the central axis.

9. The cover assembly set forth in claim 8 wherein the end wall defines at least one cut-out.

10. The cover assembly set forth in claim 9 wherein the cover portion includes an inboard surface, and includes a close-out feature extending outward away from the inboard surface of the cover portion and toward the interface portion of the hinge structure, wherein the close-out feature is disposed adjacent the cut-out of the end wall to conceal the cut-out.

11. The cover assembly set forth in claim 2 wherein the first group of the pairs of interlocking tabs includes half of a total number of the pairs of interlocking tabs, and wherein the second group of the pairs of interlocking tabs includes half of the total number of the pairs of interlocking tabs.

12. The cover assembly set forth in claim 1 wherein the pairs of interlocking tabs are positioned adjacent a perimeter of the interface portion.

13. The cover assembly set forth in claim 12 wherein the pairs of interlocking tabs are spaced from each other an approximate equal distance from each other around the perimeter of the interface portion.

14. The cover assembly set forth in claim 13 wherein each of the pairs of interlocking tabs are spaced from a perimeter of the cover portion a distance equal to or less than 30 mm.

15. The cover assembly set forth in claim 13 wherein a distance between adjacent pairs of the interlocking tabs measured around the perimeter of the interface portion is equal to or less than twice the distance between the pairs of interlocking tabs and the perimeter of the cover portion.

16. The cover assembly set forth in claim 1 wherein each of the plurality of retention tabs includes a pad surface spaced from the outboard surface of the interface portion, and with the pad surface spaced from the inboard surface of the retention tab a first distance.

17. The cover assembly set forth in claim 16 wherein the outboard surface of each of the cover tabs is spaced from the inboard surface of the cover portion a second distance, wherein the second distance is equal to or less than the first distance to bias the cover portion against the pad surface of the retention tabs.

18. The cover assembly set forth in claim 1 wherein the cover portion includes a plurality of cover walls extending inboard from the inboard surface of the cover portion to a distal edge, and interconnecting the plurality of covers tabs and the cover portion.

19. The cover assembly set forth in claim 18 wherein the plurality of cover walls are spaced from the outboard surface of the interface portion of the hinge structure.

20. The cover assembly set forth in claim 1 wherein the reference surface defines a plane.

* * * * *